United States Patent [19]

Soltysik

[11] 3,910,156
[45] Oct. 7, 1975

[54] SCREW ANCHOR CLIP
[75] Inventor: Edmund John Soltysik, Chicago, Ill.
[73] Assignee: Illinois Tool Works Inc., Chicago, Ill.
[22] Filed: June 12, 1974
[21] Appl. No.: 478,684

[52] U.S. Cl. .............................. 85/85; 85/36; 85/80
[51] Int. Cl.² .......................................... F16B 13/12
[58] Field of Search .................... 85/85, 80, 36, 32 J

[56] References Cited
UNITED STATES PATENTS

| 2,149,719 | 3/1939 | Arnest | 85/36 |
|---|---|---|---|
| 2,244,975 | 6/1941 | Tinnerman | 85/36 |
| 2,408,153 | 9/1946 | Steans et al. | 85/36 |
| 2,430,555 | 11/1947 | Burke | 85/80 |
| 2,720,135 | 10/1955 | Gisondi | 85/85 |
| 3,375,749 | 4/1968 | Coldren et al. | 85/85 |
| 3,415,155 | 12/1968 | Riddell et al. | 85/80 |
| 3,605,846 | 9/1971 | Van Niel et al. | 85/80 |

FOREIGN PATENTS OR APPLICATIONS

| 820,739 | 9/1959 | United Kingdom | 85/85 |
|---|---|---|---|
| 701,524 | 2/1966 | Italy | 85/85 |

Primary Examiner—Marion Parsons, Jr.
Attorney, Agent, or Firm—Olson, Trexler, Wolters, Bushnell & Fosse, Ltd.

[57] ABSTRACT

The embodiment of the invention disclosed herein is directed to a screw anchor clip made from a sheet metal stamping punched and configurated to provide a head end portion to receive a threaded screw therethrough. The clip further provides spaced apart wall portions having thread-engaging members struck therefrom and bent inwardly of the clip so that a threaded screw urged through the opening of the head end can be telescopically urged past the thread-engaging portions during an initial insertion of the screw. The thread-engaging portions are configurated to engage the side of the thread facing the head of the screw thereby enabling final tightening and removal of the screw from the screw anchor clip by threaded action. Locking gears are formed on the wall portions to insure that the clip will remain in the body of material into which it is inserted.

1 Claim, 6 Drawing Figures

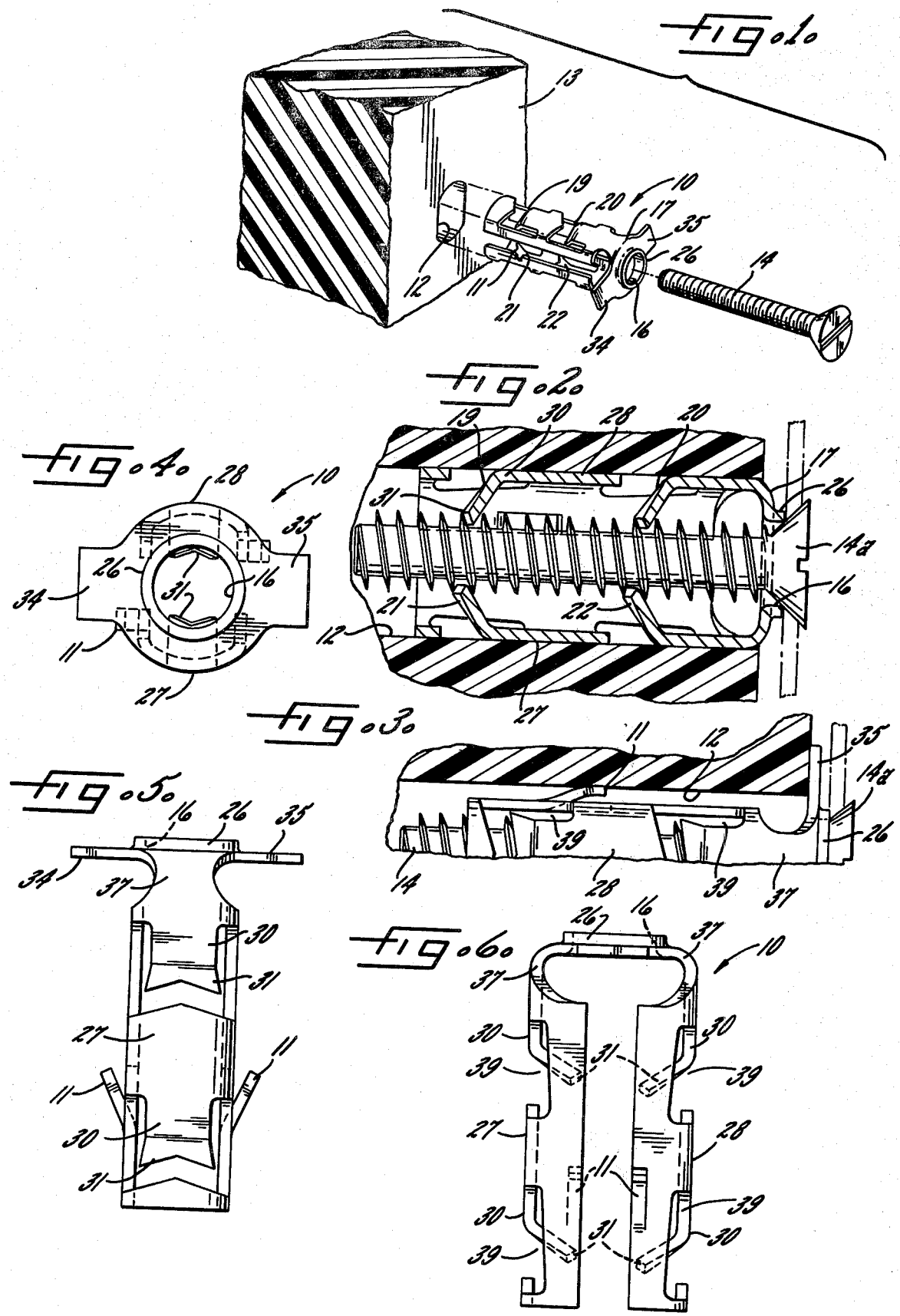

3,910,156

SCREW ANCHOR CLIP

BACKGROUND OF THE INVENTION

This invention relates generally to improvements in screw and bolt anchor structures, and more particularly to improvements in anchor clips made from sheet metal stampings and the like. While the present invention is directed primarily to anchor clips made of the sheet metal stampings, it will be understood that anchor clips formed by forging or casting of metal or plastic material may be made without departing from the spirit and scope of the invention disclosed herein.

Heretofore, bolt and screw anchor clips had been provided to function as an insert to material members, such as plastic or plaster so that a threaded bolt or screw can be inserted therein. Prior art anchors have been provided with thread portions so that bolts or screws are substantially entirely threaded into and out of the anchor. This requires a substantial length of time for the initial threaded operation to take place. This, therefore, requires that personnel spend valuable time inserting threaded screws or bolts into articles, thereby raising the overall cost of such articles.

SUMMARY OF THE INVENTION

Accordingly, it is an object of this invention to provide a new and improved anchoring clip wherein the initial insertion of the threaded member is telescopic in nature and final tightening and removal of the threaded member is accomplished by threaded action.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective exploded view illustrating the screw anchor clip of this invention;

FIG. 2 is a side sectional view of the screw anchor clip of this invention showing it inserted into material;

FIG. 3 is an enlarged fragmentary sectional view illustrating the screw anchor clip of this invention rotated 90° from the view of FIG. 2;

FIG. 4 is an end view of the screw anchor clip of this invention from the head end thereof;

FIG. 5 is a side elevational view of the screw anchor clip of this invention; and FIG. 6 is a side view rotated 90° from the side view of FIG. 5.

DETAILED DESCRIPTION OF THE ILLUSTRATED EMBODIMENT

Referring now to FIG. 1, there is seen a screw anchor clip constructed in accordance with the principles of this invention and designated generally by reference numeral 10. The screw anchor clip 10 is illustrated as being adapted for insertion into an aperture formed in material, such as plastic or the like, and held in place into the aperture by means of locking ears 11, formed on opposite sides of wall portions of the anchor clip. While only a fragmentary portion of the material is illustrated, it will be understood that the nature of the material may be of any suitable type, such as molded plastic or fiberglass or the like. The anchor clip illustrated herein has particular utility when used in conjunction with molded electrical outlet boxes having apertures formed near the outer periphery thereof to receive anchor clips. When used in this configuration, the anchor clips receive mounting screws for electrical outlets and/or switches.

In FIG. 1, the anchor clip 10 is positioned adjacent a double D-shaped aperture 12 of a body of material 13 and, as mentioned above, is held in place in the body by the locking gears 11. A threaded screw or bolt 14 is shown placed in readiness to be inserted through an opening or aperture 16 formed at the head end 17 of the anchor clip. A plurality of spaced apart thread-engaging members 19 and 20 are formed in one wall portion of the anchor clip while a corresponding plurality of diametrically opposed thread-engaging members 21 and 22 are formed on the other side wall portion.

As best seen in FIGS. 2, 3, 4, 5 and 6, the screw anchor clip of this invention is constructed of a sheet metal stamping punched and formed to provide the head end portion 17 which has an annular collar member 26 defining the aperture 16. The collar 26 adds rigidity to the clip for improved strength. Spaced apart C-shaped wall portions 27 and 28 have formed as an integral part thereof, thread-engaging means in diametrically opposed relation. For example, the pair of thread-engaging means 19 and 20 are formed on the wall portion 27, while the pair of thread-engaging means 21 and 22 are formed on the wall portion 28.

Each of the thread-engaging means are substantially similar in configuration; however, it will be understood that differences may be incorporated if desired. The thread-engaging means each include a substantially axially disposed portion 30 leading into an inwardly directed angularly disposed portion 31. The inwardly directed angularly disposed portions are substantially resilient against the forces applied thereto by insertion of a threaded screw from the head end 17. Therefore, the threaded screw 17 can be inserted initially by pushing it into the screw anchor clip and telescoping it past each of the thread-engaging means. Once the head portion 14a of the screw 14 abuts against the head end 17, further tightening of the screw is accomplished by threaded action. Removal of the screw is also obtained by threaded action.

The head end portion 17 is provided with outwardly directed tabs 34 and 35 which overlie the periphery of the aperture 12 formed in the material 13. To facilitate forming or bending of the sheet material into the screw anchor clip 10, a reduced material portion 37 is formed near the head end and forms the connection between the head end and each of the side wall portions 27 and 28.

It will be noted that the thread-engaging portions 19, 20 and 22 are formed from struck-out members of the sheet material and they include spacings 39 adjacent each of the thread-engaging members. While the screw anchor clip illustrated herein has the side wall portions thereof illustrated substantially parallel to each other, it will be understood that diverging or converging side wall portions may be incorporated so long as each of the thread-engaging portions are resilient so that the screw functions in a telescoping manner during initial insertion and cooperates with the screw in a threaded manner during final tightening and removal thereof.

What has been described is a simple and highly efficient screw anchor clip which can be used in conjunction with plastic electrical outlet boxes, and other devices, wherein a threaded screw is initially telescopically inserted past the thread-engaging portion and thereafter threadedly tightened and loosened therefrom. Accordingly, variations and modifications of this invention may be made without departing from the spirit and scope of the novel concepts disclosed and claimed herein.

The invention is claimed as follows:

1. A screw anchor clip for use in a double D-shaped bore comprising a sheet metal stamping punched and formed to provide a continuous head portion, said head including a central aperture and a pair of oppositely extending tabs for overlying the peripheral margin of an aperture in the body of material having the bore adapted to receive said screw anchor clip, an upstanding annular collar formed about said aperture and having an internal diameter greater than a screw to be accepted therethrough, a pair of C-shaped spaced apart wall portions integrally connected from said head and each depending in quatrature to said tabs, said C-shaped wall portions having a configuration in cross section substantially identical to said double D-shaped bore and acceptable therein in close tolerance configuration, the ends of each C-shaped wall being spaced from and in opposition to the free ends of the other C-shaped wall, at least two pairs of diametrically opposed thread engaging members formed from struck-out portions of said C-shaped spaced apart wall portions, each of said thread engaging portions having an axially disposed portion leading into an inwardly directed angularly disposed portion having a thread engaging terminating end and said angularly disposed portions being resilient to pressures of screw threads directed from said head end portion, whereby rapid initial insertion of screw is obtained by axial telescopic insertion of said screw into said screw anchor clip until the head of said screw comes into supportive contact with said flange encircling the aperture and final tightening and removal of the screw is accomplished by thread action between said screw and said thread engaging portions, at least one free edge of said C-shaped walls having barb means struck outwardly therefrom and facing said head, said barb means being resiliently distortable and engageable for initial retention of the clip in said bore, prior to insertion of said screw, each of said C-shaped walls at the end opposite the head being continuous to provide hoop strength to said wall.

* * * * *